(12) United States Patent
Georges

(10) Patent No.: US 6,941,037 B2
(45) Date of Patent: Sep. 6, 2005

(54) OPTICAL FIBER TRANSMISSION SYSTEM USING RZ PULSES

(75) Inventor: Thierry Georges, Perros-Guirec (FR)

(73) Assignee: Corvis Algety SA, Lannion Cedex (FR)

( * ) Notice: Subject to any disclaimer, the term of this patent is extended or adjusted under 35 U.S.C. 154(b) by 508 days.

(21) Appl. No.: 10/127,788

(22) Filed: Apr. 22, 2002

(65) Prior Publication Data

US 2004/0213510 A1 Oct. 28, 2004

Related U.S. Application Data

(63) Continuation of application No. PCT/FR00/02923, filed on Oct. 20, 2000.

(30) Foreign Application Priority Data

Oct. 22, 1999 (FR) ............................................. 99 13193

(51) Int. Cl.[7] .................................................. G02B 6/28
(52) U.S. Cl. .......................................... 385/24; 385/127
(58) Field of Search ............................ 385/2, 1, 3, 123, 385/24, 127, 147, 81, 124, 125

(56) References Cited

U.S. PATENT DOCUMENTS

| | | |
|---|---|---|
| 4,315,666 A | 2/1982 | Hicks, Jr. |
| 4,342,499 A | 8/1982 | Hicks, Jr. |
| 4,401,364 A | 8/1983 | Mochizuki |
| 4,616,898 A | 10/1986 | Hicks, Jr. |
| 4,699,452 A | 10/1987 | Mollenauer et al. |
| 4,728,170 A | 3/1988 | Robertson |
| 4,881,790 A | 11/1989 | Mollenauer |
| 5,007,705 A | 4/1991 | Morey et al. |
| 5,039,199 A | 8/1991 | Mollenauer et al. |
| 5,050,949 A | 9/1991 | DiGiovanni |
| 5,083,874 A | 1/1992 | Aida et al. |
| 5,095,519 A | 3/1992 | Dorsey |
| 5,191,586 A | 3/1993 | Huber |
| 5,191,628 A | 3/1993 | Byron |
| 5,228,105 A | 7/1993 | Glista |
| 5,283,686 A | 2/1994 | Huber |
| 5,323,404 A | 6/1994 | Grubb |

(Continued)

FOREIGN PATENT DOCUMENTS

| | | |
|---|---|---|
| EP | 0575 881 A1 | 12/1993 |
| EP | 0 734 105 A2 | 9/1996 |
| EP | 0853396 A2 | 7/1998 |
| WO | WO 97 20403 | 6/1997 |
| WO | WO 98/42088 | 9/1998 |
| WO | WO 99/07088 | 2/1999 |
| WO | WO 99/43107 | 8/1999 |
| WO | WO 01/29994 A1 | 4/2001 |
| WO | WO 01/29995 A1 | 4/2001 |

OTHER PUBLICATIONS

Stentz, A., et al., "Analog–Grade Power Raman Ring Amplifier at 1.3um", OSA Trends in Optics and Photonics, vol. 5, Optical Amplifiers and Their Applications. From the Topical Meeting, pp. 350–368, Published: Washington, DC, USA, 1996.

(Continued)

*Primary Examiner*—Thien M. Le

(57) ABSTRACT

An optical fiber transmission system using RZ pulses and having emitter means, receiver means, and a transmission line which extends between said emitter means and receiver means, the emitter and receiver means implementing wavelength division multiplexing, the transmission line comprising a plurality of main optical fiber sections presenting dispersion of a given type with dispersion-compensating means being interposed therebetween, the system being characterized in that the dispersion compensation implemented by said means is such that the spectrum width of pulses at the outlet from said means is constant over the length of the transmission line.

10 Claims, 1 Drawing Sheet

U.S. PATENT DOCUMENTS

| | | | |
|---|---|---|---|
| 5,406,411 | A | 4/1995 | Button et al. |
| 5,473,622 | A | 12/1995 | Grubb |
| 5,500,756 | A | 3/1996 | Tsushima et al. |
| 5,530,583 | A | 6/1996 | Uno et al. |
| 5,541,766 | A | 7/1996 | Mizrahi et al. |
| 5,557,442 | A | 9/1996 | Huber |
| 5,559,910 | A | 9/1996 | Taga et al. |
| 5,579,143 | A | 11/1996 | Huber |
| 5,611,016 | A | 3/1997 | Fangmann et al. |
| 5,623,508 | A | 4/1997 | Grubb et al. |
| 5,633,974 | A | 5/1997 | Chia |
| 5,636,301 | A | 6/1997 | O'Sullivan et al. |
| 5,651,085 | A | 7/1997 | Chia |
| 5,673,280 | A | 9/1997 | Grubb et al. |
| 5,675,432 | A | 10/1997 | Kosaka |
| 5,694,512 | A | 12/1997 | Gonthier et al. |
| 5,696,615 | A | 12/1997 | Alexander |
| 5,717,510 | A | 2/1998 | Ishikawa et al. |
| 5,764,406 | A | 6/1998 | Newhouse et al. |
| 5,805,621 | A | 9/1998 | Grubb et al. |
| 5,812,710 | A | 9/1998 | Sugaya |
| 5,815,299 | A | 9/1998 | Bayart et al. |
| 5,815,710 | A | 9/1998 | Martin et al. |
| 5,861,981 | A | 1/1999 | Jabr |
| 5,880,866 | A | 3/1999 | Stolen |
| 5,883,736 | A | 3/1999 | Oshima et al. |
| 5,892,615 | A | 4/1999 | Grubb et al. |
| 5,900,969 | A | 5/1999 | Srivastava et al. |
| 5,903,371 | A | 5/1999 | Arecco et al. |
| 5,920,423 | A | 7/1999 | Grubb et al. |
| 5,937,116 | A * | 8/1999 | Seto ............................ 385/24 |
| 5,940,208 | A | 8/1999 | Blaszyk et al. |
| 5,959,750 | A | 9/1999 | Eskildsen et al. |
| 5,963,361 | A | 10/1999 | Taylor et al. |
| 5,999,548 | A | 12/1999 | Mori et al. |
| 6,031,646 | A | 2/2000 | Sniadower |
| 6,055,092 | A | 4/2000 | Sugaya et al. |
| 6,057,959 | A | 5/2000 | Taylor et al. |
| 6,081,366 | A | 6/2000 | Kidorf et al. |
| 6,115,174 | A | 9/2000 | Grubb et al. |
| 6,118,575 | A | 9/2000 | Grubb et al. |
| 6,122,298 | A | 9/2000 | Kerfoot, III et al. |
| 6,147,794 | A | 11/2000 | Stentz |
| 6,151,338 | A | 11/2000 | Grubb et al. |
| 6,173,588 | B1 | 1/2001 | Berkey et al. |
| 6,181,465 | B1 | 1/2001 | Grubb et al. |
| 6,212,310 | B1 | 4/2001 | Waarts et al. |
| 6,229,935 | B1 | 5/2001 | Jones et al. |
| 6,236,498 | B1 | 5/2001 | Freeman et al. |
| 6,292,603 | B1 | 9/2001 | Mizuochi et al. |
| 6,321,015 | B1 | 11/2001 | Doran et al. |
| 6,507,689 | B2 * | 1/2003 | Tirloni et al. ................ 385/127 |
| 6,714,695 | B2 * | 3/2004 | Yang ............................. 385/2 |

OTHER PUBLICATIONS

Wen, Senfar, et al., "Distributed Erbium–Doped Fiber Amplifiers with Stimulated Raman Scattering", IEEE Phontonics Technology Letters, Feb. 1992, vol. 4, No. 2, New York, US, pp. 189–192, IEEE Log No.: 9105789.

Aida, K., et al., Long–Span Repeaterless IM/DD Optical Transmission Experiment over 300 KM using optical Amplifies, ICC '91, vol. 3, pp. 1228–1232, 1991, Published: New York, NY, USA.

Grubb, S. G., Raman Amplifiers for Broadband Communications, OFC '98, OSA Technical Digest Series vol. 2, 1998, abstract.

Suzuki, M., et al., "170 Gbit/s transmission over 10,850 km using large core transmission fiber", OFC' 98, Post deadline paper, pp. PD17–1–PD17–4, San Jose, California, USA.

Taga, H., Edagawa, N., Suzuki, M., Takeda, N., Imai, K., Yamamoto, S. and Akiba, S., "213 Gbit/s (20×10.66) over 9000km transmission experiment using dispersion–slope compensator", OFC' 98, Post deadline paper, pp. PD13–1 – PD–13–4, San Jose, California, USA.

Kubota, H., et al., "Partial Soliton Communication System", Optics Communications 87, 1992, pp. 15–18.

Chraplyvy, et al., "Equalization in amplified WDM lightwave transmission systems", IEEE Photonics, Technical Letters vol. 4, No. 8 Aug. 1992, pp. 920–922.

Chraplyvy, et al., "End–to–End equalization experiments in amplified WDM lightwave systems", IEEE Photonics, Technical Letters vol. 4, No. 4, pp. 428–429, Apr., 1993.

Masuda, H., et al., Ultra–Wideband Optical Amplification with a 3–dB Bandwidth of 67 nm Using a Partially Gain Flattened Erbium–Doped Fiber Amplifier and Raman Amplification, Optical Amplifiers and their Application, Aug. 3–5, 1994, 1997 OSA Technical Digest Series, V20, pp. MC3–1–4/40–3.

Sugaya, Y., et al., Novel Configuration for Low–Noise and Wide–Dynamic–Range Er–Doped Fiber Amplifiers for WDM Systems, Optical Amplifiers and their Application, Jun. 15–17, 1995, 1995 OSA Technical Digest Series, V18, pp. FC3–1–4/158–161.

Jacobovitz–Veselka, G.R., et al., Single–Stage Booster Amplifier with Two 980 nm Pumps Stabilized by Fiber Gratings, Optical Amplifiers and their Application, Jun. 15–17, 1995, 1995 OSA Technical Digest Series, V18, pp. FC4–1–4/162–165.

Hansen, P.B., et al., Loss Compensating in Dispersion Compensation Fiber Modules by Raman Amplification, OFC'98 Technical Digest pp. 20–21.

Rottwitt, K., et al., Detailed Analysis of Raman Amplifiers for Long–Haul Transmission, OFC'09 Technical Digest pp. 30–31.

Chernikov, S.V., et al., 10 Gbit/s Error–Free Transmission of 2–ps Pulses Over a 45–km Span Using Distributed Raman Amplification at 1300 nm, OFC' 98 Technical Digest p. 31.

Kawai, S., et al., Ultrawide 75 nm 3–dB Gain–Band Optical Amplifier Utilizing Erbium–Doped Fluoride Fiber and Raman Fiber, OFC' 98 Technical Digest pp. 32–33.

Dianov, E.M., et al., Highly Efficient 1.3 $\mu$m Raman Amplifier, OFC' 98 Technical Digest pp. 33–34.

Rottwitt, K., et al., A 92 nm Bandwidth Raman Amplifier, OFC' 98, Post–Deadline Paper PD6–1–4.

Srivastava, A. K., et al., 1 Tb/s Transmission of 100 WDM 10 Gb/s Channels Over 400 km of TrueWave FIBER, OFC' 98, Post–Deadline Paper PD10–1–4.

Masuda, H., et al., Ultra–Wideband Hybrid Amplifier Comprising Distributed Raman Amplifier and Erbium–Doped Fiber Amplifier, Electronics Letters, 25$^{th}$ Jun. 1998, vol. 34, No. 13, Online No. 19980935.

Takano, K., et al., An Optical Pre–Amplifier with Automatic Gain Control Function, Proceedings of the 1995 IEICE General Conference, Mar. 27–30, 1995, Fukuoka, Fukuoka Institute of Technology, b–1067, p. 513.

Zou et al., Compensation of Raman Scattering and EDFA's Nonuniform Gain in Ultra–Long–Distance WDM Links, IEEE Photonics Technology Letters, vol. 8, No. 1, Jan. 1996, pp. 139–141.

Park, S.Y., et al., Feasibility Demonstration of 10 Gbit/s Channel WDM Network Using Dynamic Gain–Controlled EDFAs, Electronics Letters, 5$^{th}$ Mar. 1998, vol. 34, No. 5., Online No. 19980346.

Dung, J.C., et al., Gain Flattening of Erbium Doped Fibre Amplifier Using Fibre Bragg Gratings, Electronics Letters, 19$^{th}$ Mar. 1998, vol. 34, No. 6., Online No. 19980446.

Yu, A., et al., Analysis of Optical Gain and Noise Spectral Properties of Erbium–Doped Fiber Amplifier Cascade, Optical Amplifiers and their Application, Aug. 3–5, 1994, 1994 OSA Technical Digest Series, V14, pp. FB1–1–3/124–126.

* cited by examiner

OPTICAL FIBER TRANSMISSION SYSTEM USING RZ PULSES

CROSS-REFERENCE TO RELATED APPLICATIONS

This application is a cont of PCT application PCT/FR00/02923, filed Oct. 20, 2000, which is based on French national application 99/13193, filed Oct. 22, 1999.

STATEMENT REGARDING FEDERALLY SPONSORED RESEARCH AND DEVELOPMENT

Not Applicable.

BACKGROUND OF THE INVENTION

The present invention relates to optical fiber transmission systems using return-to-zero (RZ) pulses.

A particular advantageous application of the invention lies in systems for terrestrial applications, i.e. for providing transmission over distances of less than 4000 kilometers (km).

Long-distance single-fiber transmission systems are already known that use RZ pulses, and in particular soliton type pulses, and that make use of wavelength division multiplexing.

It has recently been shown that for distances of the order of those envisaged for terrestrial applications, it is possible to achieve transmission rates that are high (of the order of 10 gibabits per second (Gbit/s) by using RZ pulses that are relatively broad, and in particular soliton pulses having a duration of 20 picoseconds (ps) to 30 ps.

In this respect, reference can be made to the following article:

D. Le Guen, F. Favre, M. L. Moulinard, M. Henry, G. Michaud, L. Macé, F. Devaux, B. Charbonnier, T. Georges "200 Gbit/s 100 km-span soliton WDM transmission over 1000 km of standard fiber with dispersion compensation and pre-chirping", OFC'97, paper PD 17 (Dallas, Feb. 16–21, 1997).

Nevertheless, the, spectrum occupied by 20 ps to 30 ps pulses still constitutes a limit on the density of wavelength division multiplexing that can be achieved using such systems.

In addition, cross-phase modulation phenomena modify the spectra of the signals and diffuse the energy of pulses to the sides of their spectra, far away from their center frequencies. As a result, cross-phase;modulation is responsible firstly for time deformation of the signal which gives rise in particular to interference between symbols, and secondly to crosstalk between channels when the wavelength channels are too close together. Such diffusion of energy to the sides of spectra of pulses also increases with channel power and with reduced spacing between the channels.

Furthermore, self-phase modulation phenomena can also prevent the channels being spaced too close together and can be responsible for a certain amount of spectrum broadening.

For all these reasons, the systems that have been proposed until now with channel spacing of less than 100 gigahertz (GHz) and a channel data rate of 10 Gbit/s have all been low-power transmission systems (power less than 2 decibels relative to one milliwatt (dBm)) which limits range and makes it necessary to provide a large number of amplifiers.

Consequently, it will be understood that it is desirable to be in a position to control pulse spectra closely over the entire length of a line, with this being particularly important when using broad pulses since their spectrum bandwidth is narrow.

An object. of the invention is thus to propose a solution making it possible to control the spectrum width of pulses along a transmission line in a manner that is particularly simple.

It has been known for several years that it is desirable in transmission systems using RZ pulses to have dispersion-compensating means distributed all along the transmission line.

In this respect, reference can advantageously be made to the following article: "Partial soliton communication system", Optics Communications 87, 1992-15-18.

Document WO 97 20403 describes a soliton transmission system comprising an emitter and a receiver interconnected by an optical fiber. The fiber is subdivided into alternating sections of fiber having abnormal dispersion and sections of fiber having normal dispersion, said sections presenting lengths that are equal.

In general, such dispersion-compensating means are distributed at regular intervals along the fiber of the transmission line. They are all identical and each of them provides the same dispersion-compensation.

BRIEF SUMMARY OF THE INVENTION

The invention proposes an optical fiber transmission system using RZ pulses, the system comprising emitter means, receiver means, and a transmission line which extends between said emitter means and receiver means, the emitter and receiver means implementing wavelength division multiplexing, the transmission line comprising a plurality of main optical fiber sections presenting dispersion of a given type with dispersion-compensating means being interposed therebetween, the system being characterized in that the dispersion compensation implemented by said means is such that the spectrum width of pulses at the outlet from said means is constant over the length of the transmission line.

Preferably, the transmission line includes means in the vicinity of the receiver for compensating the cumulative dispersion as accumulated over the entire line.

Such a system is advantageously used for wavelength division multiplexed (WDM) transmission in which the various channels have a data rate of about 10 Gbit/s or higher and the spacing between channels is 25 GHz or less.

A particularly advantageous application lies in terrestrial transmission systems.

Other characteristics and advantages of the invention appear further from the following description. This description is purely illustrative and non-limiting. It should be read with reference to the sole accompanying figure which is a diagram of a transmission system constituting a possible embodiment of the invention.

DETAILED DESCRIPTION OF THE INVENTION

Figure 1:
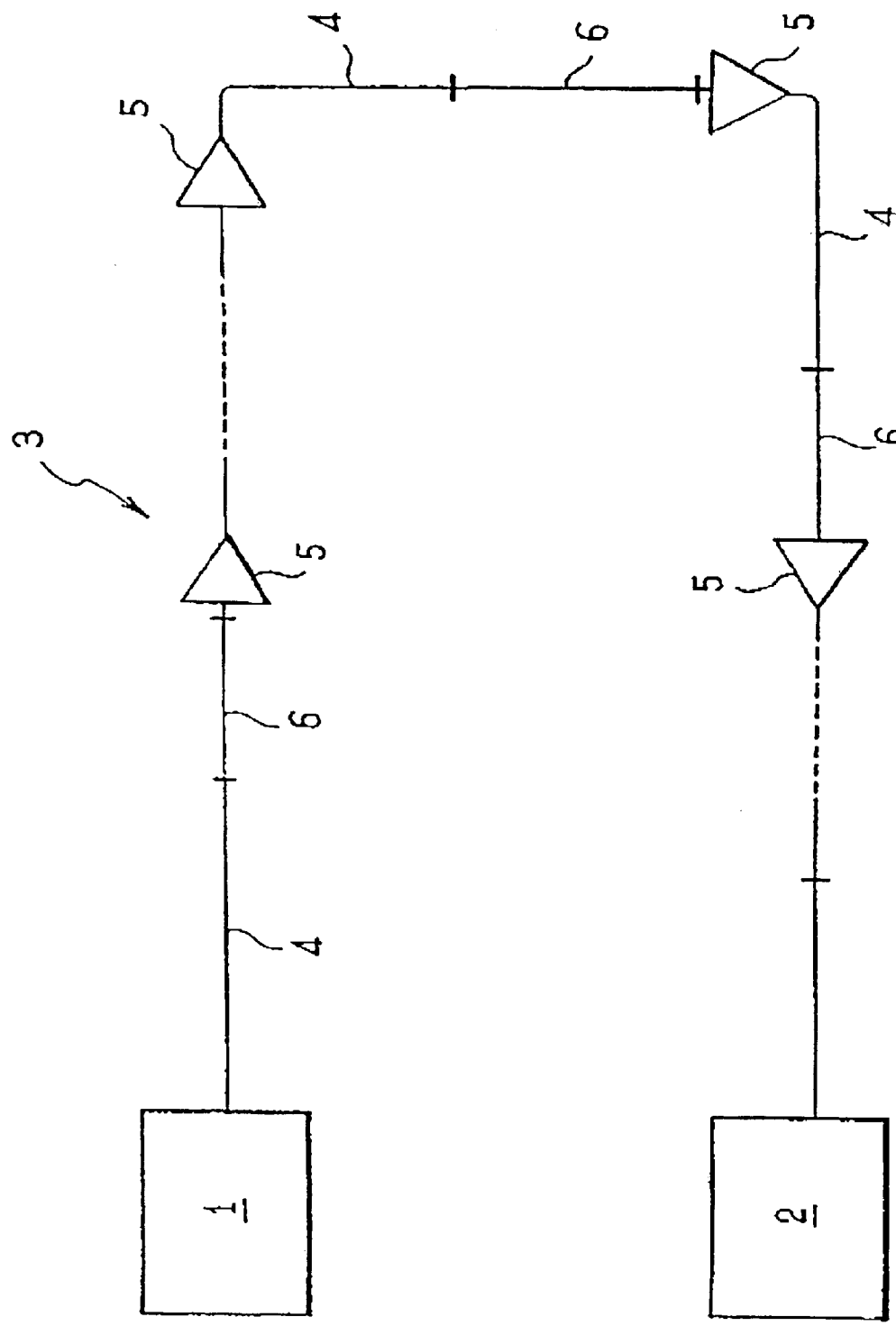
FIG. 1 is a block diagram of one embodiment of a transmission system according to the present invention.

The transmission system shown in the figure comprises emitter means 1, receiver means 2, and a transmission line 3, which is constituted, for example, by a terrestrial transmission line and which extends between said emitter and receiver means 1 and 2.

The emitter means 1 and the receiver means 2 include multiplexing and demultiplexing means making it possible to transmit a plurality of channels simultaneously over the line 3, where the channels correspond to different transmission wavelengths.

The signals that are emitted and received are advantageously RZ pulse signals, and in particular solitons. Logic "1s" are encoded using pulses of light having a duration of 40 ps to 80 ps, and logic "0s" are encoded by the absence of light.

The data rate of each of the various channels can be 10 Gbit/s, with the channels being spaced apart from one another by 25 GHz. The line 3 comprises a plurality of optical fiber sections 4 with amplifiers 5 interposed between them together with dispersion-compensating means 6.

The sections 4 are constituted by optical fiber portions each having the same length, for example, (which length lies preferably in the range 50 km to 100 km).

The fiber in the sections 4 is a conventional fiber having abnormal dispersion, preferably greater than 4 picoseconds per nanometer per kilometer (ps/nm/km), e.g. 17 ps/nm/km.

The dispersion-compensating means 6 are constituted by portions of a fiber having normal dispersion which is preferably less than −20 ps/nm/km, e.g. −80 ps/nm/km.

The lengths of the various portions 6, i.e. the compensation they provide, is not identical over the entire transmission line.

These lengths are selected during manufacture of the transmission line so as to obtain close control over the spectrum width of the pulses.

More precisely, the compensation performed by a portion 6 is selected not as a function of the cumulative dispersion accumulated over the section 4 of abnormal fiber preceding it, but as a function of the spectrum width of the pulses leaving the portion 6, with said width being maintained constant by said portions 6 over the entire length of the transmission line.

Thus, when each of the sections 4 of abnormal fiber is 100 km long, which corresponds to the cumulative dispersion over each of these sections being 1700 ps/nm, the dispersion compensation performed by a portion 6 can be −1500 ps/nm if, during manufacture, a tendency to spectrum broadening is observed in the pulses output by said compensation portion 6; it could be −1900 ps/nm if, on the contrary, a tendency to pulse narrowing is observed.

In addition, in order to ensure that dispersion is nevertheless compensated correctly over the entire transmission line 3, the length of the compensation portion 6 immediately ahead of the receiver means 2 is selected to compensate appropriately the cumulative dispersion as accumulated over the entire transmission line, e.g. so that the overall dispersion over the entire transmission line is equal to a few tenths of a ps/nm/km, e.g. typically about 100 ps/nm.

By way of example, a structure of the type described above makes it possible to achieve WDM transmission of N×10 Gbit/s (where N is an integer) over 5×100 km (up to 30 dB of loss per step) with 25 GHz spacing between channels; or indeed WDM transmission of N×10 Gbit/s (for integer N) over 12×100 km (up to 25 dB of loss per step) with 25 GHz spacing between channels.

The invention is described above for the case where the compensation means are constituted by portions of optical fiber having dispersion of sign opposite to that in the main portions of the transmission line. Naturally, other types of dispersion-compensating means could be envisaged.

What is claimed is:

1. An optical fiber transmission system using RZ pulses, the system comprising emitter means, receiver means, and a transmission line which extends between said emitter means and receiver means, the emitter and receiver means implementing wavelength division multiplexing, the transmission line comprising a plurality of main optical fiber sections presenting dispersion of a given type with dispersion-compensating means being interposed therebetween, the system being characterized in that the dispersion compensation implemented by said means is such that the spectrum width of pulses at the outlet from said means is constant over the length of the transmission line.

2. A system according to claim 1, wherein the transmission line includes means in the vicinity of the receiver for compensating the cumulative dispersion as accumulated over the entire line.

3. A system according to claim 2, wherein the main optical fiber sections have abnormal dispersion.

4. A system according to claim 3, wherein the main optical fiber sections are of a length lying in the range about 50 km to about 100 km.

5. An optical fiber transmission system according to claim 1, wherein the system uses wavelength division multiplexed RZ pulses with the various channels having a data rate of about 10 Gbit/s or higher and with the spacing between the channels being 25 GHz or less.

6. A system according to claim 1, wherein the system is a terrestrial transmission system.

7. A system according to claim 1, wherein the main optical fiber sections have abnormal dispersion.

8. A system according to claim 1, wherein the main optical fiber sections are of a length lying in the range about 50 km to about 100 km.

9. A system according to claim 2, wherein the main optical fiber sections are of a length lying in the range about 50 km to about 100 km.

10. A system according to any of claims 1, 2, 3, 4, 7, 8, or 9, wherein the RZ pulses have a duration lying in the range about 40 ps to about 80 ps.

* * * * *